United States Patent Office 3,682,653
Patented Aug. 8, 1972

3,682,653
GRAIN CONDITIONER-MODIFIER CHEMICAL COMBINATION
Richard Paul Mommer, Loveland, Colo., assignor to Loveland Industries, Inc., Loveland, Colo.
No Drawing. Filed Mar. 2, 1970, Ser. No. 15,898
Int. Cl. A23l 1/20
U.S. Cl. 99—103                                                6 Claims

ABSTRACT OF THE DISCLOSURE

There is provided a grain conditioner composition for application to a mass of whole kernel grain, for preparing grain kernels in a pre-processing kernel phase thereof, consisting essentially of, in combination, a mixture of liquid lecithin, a mold-inhibitant food grade acid capable of reducing the pH of said lecithin and permitting said lecithin to become water dispersible, and water. The present invention also extends to a method for the pre-production phase conditioning of mass whole grain kernels employing the aforementioned composition as well as a liquid chemical surfactant-lubricant grain conditioner composition for use in the pre-phase preparation of grain including the aforementioned composition.

In the agricultural field, feed processors, cattle feeders and farmers make and use a grain-rolled livestock feed. Rolled grain feed is conventionally made by various methods, one being rolling or flaking, and production costs are a definite factor.

In such grain-rolling feed production industry, the thinner the resultant grain rolled flake the more desirable, because of resultant greater feed efficiency. The thinner rolled-flake, as compared to a thick flake, ruptures more starch cells of the grain, and thus an increase in gelatinization occurs and available dextrose is increased. The carbohydrate raw starch break-down is necessary for animal consumption or assimilation.

In the mill-rolling plant, heretofore as far as known, the production capacity is limited because of lack of sufficient moisture, among others, in the grain. That rolling process is conventionally done by first steaming or partially cooking the grain to soften it to be able to more easily roll or flake the resultant grain mass. There has been considerable resistance heretofore as the grain passes through the rollers due to such lack of moisture, and heretofore to be able to maintain a reasonable production volume, only limited moisture can be introduced in a steam chamber.

I have developed my present invention of a grain conditioner and modifier as a grain processing pre-rolling phase aid in that grain rolling industry. My conditioner and modifier formula is a new liquid combination of chemicals adapted to be diluted with water and sprayed on the grain which is to be steam rolled or flaked, and which novel formula rapidly penetrates the grain kernel to open up the pores of each kernel, among others, to permit moisture to enter the kernel with the chemical of the composition, and to permit additional moisture to enter the kernels when the grain is later steamed preparatory to being rolled. My conditioner-modifier formula, when so sprayed on the grain in preparation to the rolling process, in addition, greatly reduces production cost in the rolling process in that the grain is sufficiently pre-softened to substantially reduce the roller resistance during the rolling and thus reducing electric amperage costs, and also permitting a substantial speeding-up of the production rolling process, resulting in greater production per hour. Actual field condition tests, of the use of my new formula, have shown production increases of from 25% to 50%. Further, my conditioner-modifier is a formula designed to effect a reduction in the interfacial tension within the grain mass itself, mainly, to permit that mass to flow more readily in grain handling equipment and to prevent that mass from "bridging" or bulk-mass restricting in the hopper storage bins.

With the foregoing problems and objections to be overcome, I have developed a new pre-processing additive combination of 2 chemicals resulting in a new and different chemical structure.

I apply my novel grain conditioner and modifier formula in a water solution to the grain preferably when it is being unloaded and as it enters the mill storage bin for the rolling or flaking process. Although it may be applied anywhere in the grain handling system, I prefer to treat that grain before it enters the bin and where it will then be held in the bin about 4 to 12 hours before being roll-processed. During that conditioning period, my novel conditioner-modifier formula pre-softens the grain kernels in preparation to entering the steam chamber, and thus facilitating the penetration of moisture into the grain more readily before and also later when the grain enters the steam chamber and goes through the rolling process.

In the preferred form my novel grain conditioner and modifier Formula I use a combination of about 4½ parts of lecithin, 2½ parts of a suitable food grade acid, such as propionic acid, and 1 part of water.

Lecithin is nature's principal surface active agent and lubricant. It is used in this formula because of its excellent lubricating characteristics to impart a slick film on each grain kernel to assure a good grain-flow or anti-bridgment in the handling of the treated grain prior to the rolling thereof under high moisture conditions, along with reduction of surface tension of water to increase moisture penetration of the grain. Lecithin is obtained mainly from vegetables and particularly soy beans.

This general type of lecithin can be more accurately identified as phosphatides or phospholipides. The principal components of the natural mixture of chemical lecithin are: (phosphatidyl choline), cephalin (phosphatidyl ethanolamine), lipositol or inositol phosphatides (phosphoinositides) and related phosphorous-containing lipides.

I use substantially 2½ parts of propionic acid, in my novel combination with lecithin, though most other food grade acids could be used. That acid reduces the pH of the lecithin and renders it immediately water dispersible, so as to make the lecithin water solution quickly and conveniently applicable to the grain kernel mass, during normal production procedure. Without that acid, lecithin could not be dispersed in water quickly and conveniently for application of my composition to grain.

I wish to emphasize my new combination and use of lecithin and propionic acid, for such application to grain for the purposes noted, and further, because of the mold inhibition result thereof, a mold which could otherwise result to the grain from the addition of moisture thereto without such an acid, cannot occur with that acid component, as explained.

I do not wish to be confined in my novel combination to propionic acid, however, since other food grade acids could accomplish the primary objectives, of reducing the lecithin pH and accomplishing immediate dispersibility of the new resultant lecithin-acid chemical in water preparatory to steam-rolling or flaking of the grain, in grain spraying.

The water part of my formula functions as a stabilizer, to clear the solution and to minimize partial separation of my new chemical combination composition in especially cold temperatures, but I do not wish to be limited by the use of water, as my novel combination of lecithin and a food grade acid such as propionic acid functions, as explained, without the need of the addition of water in that modifier composition, as heretofore explained. Neither of those 2 chemicals, lecithin nor propionic acid, by themselves, applied separately on grain, could perform the function accomplished as a result of my novel beforehand explained combination of those 2 chemicals and the application of the new resultant beforehand combination thereof to the grain.

My said novel combination of lecithin and propionic acid produces a synergistic result, when used in the preparation of grain for the purpose mentioned. My novel blend of those 2 components results in a new chemical which will instantly disperse, solubilize and emulsify in water to provide a practical, efficient grain conditioner-modifier. My new use of the said combined 2 components, lecithin and propionic acid, in my novel resultant composition when diluted and sprayed onto grain, results in moisture entering the kernels in that pre-phase stage as well as later in the steam chamber, better entering such prepared grain kernels due to the prior application of my novel new chemical combination. Namely, among others, then the grain readily absorbs a much greater quantity of moisture from the dispersed-in-water-lecithin than would otherwise occur without the prior preparing of the grain by my novel formula.

I have found that lecithin by itself, even the type claimed to be processable for better water dispersibility, will not immediately blend into water, but much time is needed for some hydration thereof and a very high speed agitation thereof is also needed to accomplish such blending, and I have found that system not to be practical to adjust grain moisture. It was to overcome that difficulty, of introducing lecithin into a water stream to achieve grain moisture absorption, that I conceived and perfected my novel formula of a pre-additive mixture of propionic acid with the lecithin, as explained hereinbefore.

It is to be further emphasized that the use of the acid in my novel modifier-conditioner, as explained, partially ruptures the starch cells of the grain and thereby starts the conversion of the raw carbohydrate starches into simple sugar, or begins to release dextrose resulting in improved feed efficiency. This latter occurs during the 4 to 12 hours period while the grain is being held in a storage bin, after the grain is sprayed with my novel formula, and before the grain is roll processed into the desired thin resultant flakes. A shorter holding period may provide this result. I use approximately 8 liquid ounces of my novel chemical mixture per ton of grain, in my preliminary spraying of the grain by my novel chemical combination, and preferably, with that combination I use sufficient water so that the moisture content of the grain, during that pre-rolling storage period stage, is raised in moisture content to about 18%, preferably. The formula may also be added directly to the grain without water and the moisture rapidly increased to a higher level during the later grain retention in the stream chamber, as a result.

In the preferred embodiment of my invention herein, I describe its use as a pre-treatment phase stage of whole grain before the conventional steam-rolling flake or other production thereof, among others, in the livestock feeding industry, but I do not wish to be limited thereto.

In such a pre-treatment phase of grain rolling production, it is a principal object of my invention, therefore, to provide a novel liquid chemical grain conditioner and modifier combination, of a lubricant surfactant and a food grade acid chemical, resulting in a new chemical combination, which is then capable of being sprayed onto the whole grain kernels, to penetrate the grain kernels and thereby soften the kernel and open the pores of each kernel, so that moisture and the lubricant then enters into the pores, for effecting a relatively rapid softening of the grain kernels and for lubricating each kernel and also for reducing interfacial tension of the grain mass, and to cause the start of starch rupture conversion in the kernel to simple sugar, all before the grain is later steamed-rolled into flakes.

A further object of my invention, is to provide such a novel liquid chemical grain conditioner and modifier chemical combination for effecting a relatively rapid softening and lubricating of each kernel exterior and for reducing liquid surface tension of the kernel in a grain mass and in which novel combination of a lubricant-surfactant and a food grade acid the acid thereof also effects a quick dispersion of said lubricant-surfactant with and into the water or steam as may be added thereto.

It is a further object of my invention to provide a liquid grain conditioner and modifier chemical combination, of a normally non-dispersable in water lubricant-surfactant, with a food grade acid, and which acid effects a rapid dispersion of that lubricant-surfactant and adapts the lubricant-surfactant to be dispersible in water for convenient spray application to whole grain, when so combined with water.

More specifically, it is an object of my invention to provide a highly efficient liquid grain lubricant and penetrant pre-rolling conditioner, adapted to be dispersed in water and applied to whole grain before the steam-rolling or flaking production thereof, and which combination consists of an appropriate mixture of lecithin and a food grade acid, such as propionic acid, and which combination produces a new chemical which, when diluted with water, is adapted to be sprayed on whole grain in the pre-rolling or flake step thereof.

Another object of my invention is the provision of a novel liquid grain chemical combination of a lubricant, a food grade acid and water, adapted for application to whole grain, to lubricate, and to soften the whole grain mass and to act as a mold inhibitant to the treated whole grain kernel mass for a quicker roll processing, as a result of said kernal softening and lubrication and as a result of the surface tension of the kernels being thereby reduced, than could otherwise be accomplished.

In view thereof, I shall now briefly restate my invention.

I have developed a new chemical formula consisting of 4½ to 6 parts of lecithin and more particularly consisting of: phosphatides or phospholipides (the principal components of the natural lecithin mixture are chemical lecithin (phosphatidyl choline), cephalin (phosphatidyl ethanolemine), lipositol or inositol phosphatides (phosphoinsitides) and related phosphorous-containing lipides); to which I add 2 to 3 parts of propionic acid; and to that lecithin-propionic acid blend I add about 1 part of water, as a stabilizer, though the water is not essential to the functioning of the blend. The water clears the appearance of the blend, making it more appealing in appearance. Further, in cold temperatures, the water functions to minimize the tendency of a partial separation of the blend.

I have discovered the propionic acid added to lecithin reduces the pH of the lecithin to render it immediately water dispersable, and, of course, the acid increases fluidity to promote better handling characteristics. I chose to use propionic acid in my new and unique combination with lecithin further, among others, because of its mold inhibition function. For the purpose of my new chemical combination, I do not wish to be confined to propionic acid, since other food grade acids could accomplish the primary objective of reducing the lecithin pH, reducing its viscosity, and making it immediately dispersible in water, and facilitating the functional practical use of lecithin as a grain conditioner, as well as acting as a grain kernel penetrant.

My said new combination of those 2 wholesome food grade chemicals, namely, lecithin and propionic acid, produces a new resultant chemical combination of a brown viscous liquid. When that new chemical is diluted with a small amount of water, substantially in proportion aforesaid, and the resultant combination then sprayed, as explained, onto grain kernels when the grain is brought into a rolling-mill elevator, and the grain is then stored in preparation for the roll-milling, then certain beneficial results will be accomplished by my new chemical combination, as explained, and as that grain is stored for about 4 to 12 hours before being rolled-processed.

It will be understood that the food grade penetrant acid, being propionic acid, as explained in this embodiment, I therefore refer to as a penetrant acid. The penetrating characteristic accomplishes an opening of the pores of each grain kernel, for reasons explained. One of those reasons is to thereby cause a start of starch rupture conversion in those pores of the kernel to sugar as a result of that penetration.

It is to be further understood that I use lecithin in this preferred embodiment of my invention as both a surfactant, or to reduce surface tension of liquid on the grain mass, and also, as a lubricant to coat the exterior of each kernel there with the lecithin. Those functional terms, surfactant and lubricant, indicate those different meanings or results and it is to be remembered that both are accomplished by the lecithin element of my combination.

The new functional results of such use of my new conditioner modifier are: to pre-soften the grain kernels, by penetrating the pores of each kernel and permit moisture entering then, as well as later; to lubricate each grain kernel and the resultant mass, to prevent "bridging or bulk-globulization" of the stored grain; to provide faster later roll processing, with less electrical amperage cost, because of the lubricated grain rolling being easier and faster; to have a thinner grain flake being able to be formed as a result of the rolling of that softer grain; to accomplish a greater absorption of moisture by the grain, as a result of its pores being opened before the rolling, and on the steam-rolling later process; and, to have a better feed value grain flake resultant product, due to the pre-roll step of the grain kernels being penetrated by my said novel composition formula pre-roll conditioning, with better gelatinization of the starch of the grain when the grain is later exposed to high temperature and moisture in the later steam chamber rolling-flake production stage, thereby increasing the starch-cell resultant rupture and grain kernel release of dextrose in the later cooking rolling production phase.

Thus, the propionic acid ingredient of my novel chemical combination penetrates the waxy coating of grain and the lecithin reduces surface tension of water, to increase moisture penetration therein; and the lecithin lubricant component produces a slick characteristic of the grain kernels and better adapts the grain kernel mass thereafter to flow more freely without bridging and thereby reduces friction thereof on the rollers as the grain is later roll-flaked processed; and, further, as a result, the lecithin is better absorbed into the grain due to the said acid penetrating and opening the kernel pores and thus results in an improved resultant grain flake having greater fat metabolism characteristics than would otherwise result, were my conditioner combination not applied to the grain beforehand.

In this preferred embodiment of my novel invention and in which I use propionic acid as the food grade acid, it should be understood that said propionic acid can have a certain amount of a moisture content. Propionic acid is soluble in water. The lecithin element of my novel composition is principally not soluble in water. However, it should be borne in mind that my use of propionic acid accomplishes a quick dispersability of the otherwise insoluble lecithin into and with moisture. Also, later, in the grain processing, additional moisture contacts the grain mass in a later stage production of the grain, such as in a later steam-rolling of the grain mass, and so it should be borne in mind that the lecithin, in that latter phase, is likewise dispersable in that latter moisture as a result of my novel use of propionic acid with the lecithin for making the lecithin dispersable in that moisture.

Also, that the propionic acid or food grade acid ingredient of my combination, in its grain kernel waxing coating penetration, among others, results and aids in increased gelatinization, in that said acid opens the pores of the grain kernels and starts the carbohydrates starch conversion of that grain content by a rupture of the starch cell thereof, and which rupture is completed in the later steam cooking phase on flake-roll production of the grain.

Also, my said acid ingredient, as a result of said grain penetration, in addition to said lubrication and increased gelatinization, and as a further result of that opening of the pores thereof, helps to solubilize the protein content of the grain kernels on the later roll-steam flaking production thereof, making the feed more digestible.

I have adopted and used the trademark of "E-Z Flake" with and to represent my said novel chemical combination, aforesaid.

In this feed use embodiment of my invention I proportion into a water stream approximately 8 fluid ounces of my said novel "E-Z Flake," grain conditioner and modifier chemical composition per ton of grain and meter sufficient water to bring the grain moisture up to approximately 18%. During the later stage steam or roll-process of the grain, my said novel grain conditioner and modifier liquid chemical combination beforehand sprayed onto the whole grain, results, among others, in the resultant rolled-flaked grain having a higher starch gelatinization than would otherwise be obtained without the use of my novel chemical modifier and conditioner, thus improving the nutrient availability to livestock using such resultant flaked grain made from grain pre-conditioned with my novel chemical product. Another distinct advantage resulting from the use of my novel lecithin-propionic acid chemical combination conditioner to whole grain, as explained, before the roll-flaking process, is that the resultant flake is softer and less brittle, than would otherwise result from flakes made from grain without my novel conditioner chemical, and, further, with the definite very beneficial result of the flakes made from grain having been prepared with my conditioner having less breakage and with less fine dust accumulation resulting during packaging, shipping and handling thereof in the industry.

The hereinbefore explained penetration of the grain kernel characteristics of the propionic acid component, of my over-all new chemical combination heretofore explained, is to be understood as accomplished as a result of that acid tending to "eat" through the natural waxy exterior coating of the grain cereal, and, thereby, an opening of the pores of each grain kernel results for more rapid penetration of both the lecithin element and also moisture into the kernels, and a quicker starch conversion of the grain kernels into simple sugar also results, and a more soluble protein results in the grain kernels.

While a preferred form of my invention has been described in some detail, together with the theories which it is believed to best explain its success, it is to be understood that the invention is not limited to the precise procedure described, nor is it dependent upon the accuracy of the theories which have been advanced. On the contrary, my invention is not to be regarded as limited except insofar as such limitations are included within the terms of the accompanying claims in which it is the intention to claim all novelty inherent in the invention as broadly as it is permissible in view of the prior art.

Many changes and modifications may be made in my invention, as explained and described in the preferred embodiment described herein, within the scope, spirit and teaching thereof. I therefore wish to be bound only by the hereunto appended claims.

What I claim and desire to secure by Letters Patent is:

1. A grain conditioner composition adapted to be sprayed on a mass of whole kernel grain, for preparing grain kernels in a pre-processing kernel phase thereof, consisting essentially of, in combination:

(a) a mixture of liquid lecithin, (b) propionic acid as a mold-inhibitant food grade acid, capable of reducing the pH of said lecithin and rendering such water dispersible, and (c) water, said acid permitting substantially quick dispersal of said lecithin with said water, whereby, on the spraying of said composition on the kernels of whole grain, a kernel coating by said lecithin is effected to reduce the surface tension of said water by lecithin and to further reduce the interfacial tension of the grain mass, said acid also penetrating the grain kernel pores to effect a resultant entry therein of both the moisture and the lecithin and further for effecting the start of starch rupture conversion of the individual kernels into sugar, and whereby moisture can readily enter the kernel pores on subsequent steam treatment of the mass, and upon later phase steam-rolling of the grain kernel mass, interfacial tension of the kernel mass is also substantially eliminated.

2. The composition of claim 1, wherein said lecithin is employed in an amount of about four and one-half parts; said food grade acid is employed in an amount of about two and one-half parts; and said water is employed in an amount of about one part, by volume.

3. A method for the pre-production phase conditioning of a mass of whole grain kernels, which comprises spraying the mass kernels with a mixture consisting essentially of liquid lecithin, propionic acid as a mold-inhibitant food grade acid capable of reducing the pH of said lecithin and rendering such water dispersible, and water, said food grade acid dispersing the liquid lecithin readily into and with the water.

4. The method of claim 3, wherein said lecithin is employed in an amount of about four and one-half parts; said food grade acid is employed in an amount of about two and one-half parts; and said water is employed in an amount of about one part, by volume.

5. A liquid chemical surfactant-lubricant grain conditioner composition for use in the pre-phase preparation of grain, adapted to be sprayed onto a mass of whole kernel grain for penetrating, surfacting and lubricating said grain, consisting essentially of, in combination, liquid lecithin and propionic acid as a mold-inhibitant food grade acid, capable of reducing the pH of said lecithin and rendering such water dispersible.

6. The composition of claim 5, wherein said lecithin is employed in an amount of about four and one-half parts; said food grade acid is employed in an amount of about two and one-half parts; and said water is employed in an amount of about one part, by volume.

References Cited

UNITED STATES PATENTS 2,564,106 8/1951 Gribbins et al. ------ 99—153 X

HOWARD R. CAINE, Primary Examiner

U.S. Cl. X.R.

99—153; 252—49.9